United States Patent
Metz

(10) Patent No.: US 10,836,490 B2
(45) Date of Patent: Nov. 17, 2020

(54) WALL VENT AND FLUSHING METHOD USING SAME

(71) Applicant: Sell GmbH, Herborn-Burg (DE)

(72) Inventor: Marcel Metz, Herborn (DE)

(73) Assignee: SELL GMBH, Herborn-Burg (DE)

( * ) Notice: Subject to any disclaimer, the term of this patent is extended or adjusted under 35 U.S.C. 154(b) by 237 days.

(21) Appl. No.: 15/761,719

(22) PCT Filed: Feb. 8, 2017

(86) PCT No.: PCT/EP2017/052681
§ 371 (c)(1),
(2) Date: Jul. 16, 2018

(87) PCT Pub. No.: WO2017/137407
PCT Pub. Date: Aug. 17, 2017

(65) Prior Publication Data
US 2020/0239141 A1     Jul. 30, 2020

Related U.S. Application Data

(60) Provisional application No. 62/293,168, filed on Feb. 9, 2016.

(51) Int. Cl.
*B64D 11/00* (2006.01)
*F16K 24/04* (2006.01)
*B64D 11/04* (2006.01)

(52) U.S. Cl.
CPC .......... *B64D 11/0007* (2013.01); *B64D 11/04* (2013.01); *F16K 24/04* (2013.01)

(58) Field of Classification Search
CPC ...... B64D 11/0007; B64D 11/04; F16K 24/04
(Continued)

(56) References Cited

U.S. PATENT DOCUMENTS

| | | |
|---|---|---|
| 5,322,099 A | 6/1994 | Langlois |
| 8,789,719 B2 | 7/2014 | Whelan |

(Continued)

*Primary Examiner* — Claude J Brown
(74) *Attorney, Agent, or Firm* — Andrew Wilford

(57) ABSTRACT

A venting outlet (1) for a drinking water supply system of an aircraft is proposed, having an inlet opening (3) which is arranged on a rear side of the venting outlet and is intended for receiving a venting fluid, in particular air, from the drinking water supply system, and further having a venting opening (6) arranged on a front side of the venting outlet and intended for discharging at least some of the received venting fluid to an external surroundings of the venting outlet (1). According to the invention, the venting outlet (1) further comprises a flushing connection (5) and a cover (4) which can be mounted on the flushing connection (5) and can be removed therefrom and which has at least one through-hole (16), wherein the venting opening (6) is formed by the at least one through-hole (16) in the cover (4) mounted on the flushing connection (5), and the flushing connection (5) is designed, only with the cover (4) removed from the flushing connection (5), for coupling a flushing fluid line (55) on the front side of the venting outlet and for introducing a flushing fluid, in particular drinking water, through the flushing connection (5) to the inlet opening (3) of the venting outlet. Also proposed are a wall element having the proposed venting outlet and a flushing method for a drinking water supply system with use of the proposed venting outlet.

16 Claims, 6 Drawing Sheets

(58) Field of Classification Search
USPC .................................................... 244/118.5
See application file for complete search history.

(56) References Cited

U.S. PATENT DOCUMENTS

| | | |
|---|---|---|
| 9,096,321 B2 | 8/2015 | Burd |
| 2013/0312853 A1* | 11/2013 | Burd ................ F16K 15/063 137/535 |
| 2014/0102553 A1* | 4/2014 | Burd ................ E03B 1/042 137/315.01 |
| 2016/0167787 A1* | 6/2016 | Flashaar ............ F16L 55/00 137/798 |

* cited by examiner

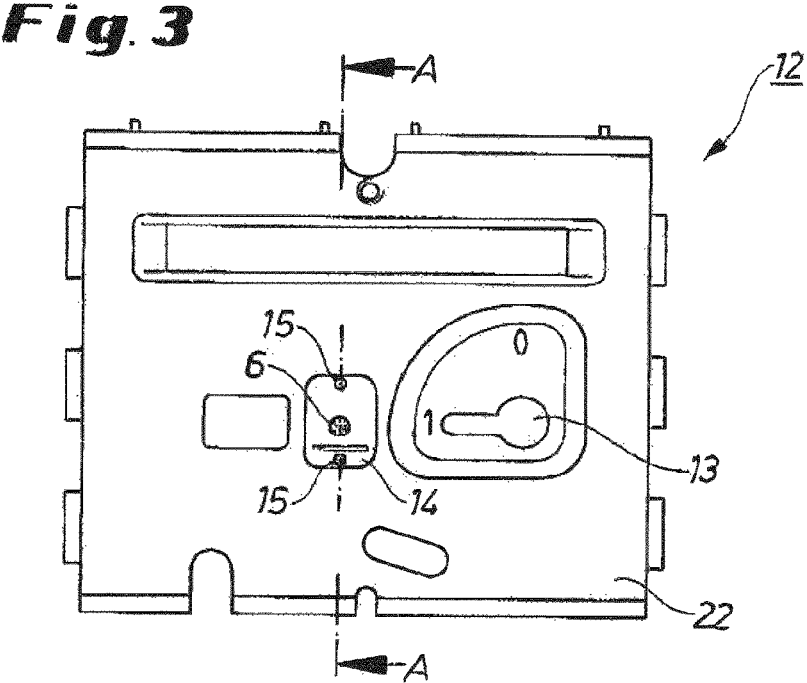
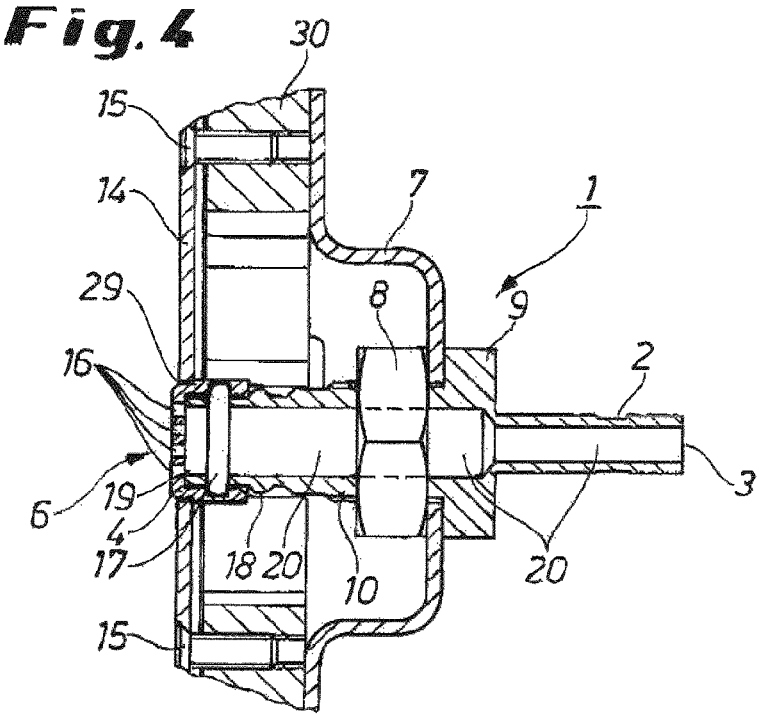

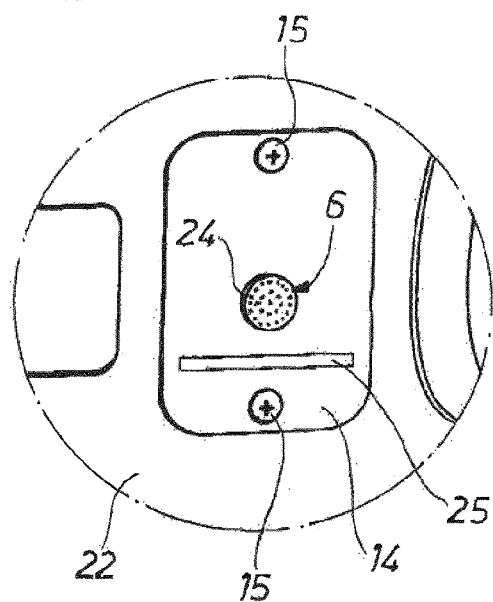
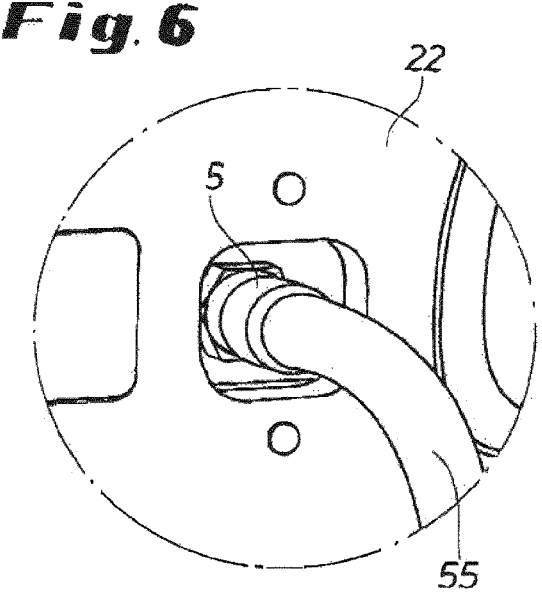

WALL VENT AND FLUSHING METHOD USING SAME

CROSS REFERENCE TO RELATED APPLICATIONS

This application is the US-national stage of PCT application PCT/EP2017/052681 filed 8 Feb. 2017 and claiming the priority of U.S. provisional application 62/293,168 filed 9 Feb. 2016.

FIELD OF THE INVENTION

The present invention relates to a vent outlet for a drinking water supply system of an aircraft and having an intake port provided on a rear end of a vent-outlet fitting for receiving a vent fluid, particularly air, from the drinking-water supply system, and also having a vent port on an outer end of the vent-outlet fitting for feeding at least a portion of the vent fluid received to the surroundings of the vent-outlet fitting.

The invention further relates to a wall element for a galley with a vent outlet of the type described immediately above.

The invention also relates to a method of flushing a drinking water supply system of an aircraft with such a wall element and vent outlet.

BACKGROUND OF THE INVENTION

Today's aircraft, particularly airplanes, are equipped with a drinking-water supply system. The drinking-water supply system comprises a drinking water tank with drinking-water supply lines connected thereto through which drinking water can be conveyed to points of use. The points of use are particularly in an on-board kitchen, also called a galley, of the aircraft. Such a point of use is a drinking water tap, for example, from which the air crew can draw drinking water. Such a point of use can also be a device for preparing foods and/or beverages, such as a steam oven, for example, to which drinking water can be fed for internal steam generation via a drinking-water supply line of the drinking-water supply system, or a beverage preparation apparatus.

For the drinking water to be available through the drinking-water supply lines within a predefined pressure range, the drinking-water supply system comprises at least one air bleed valve through which excess air that is particularly introduced during filling of the drinking-water supply system can be discharged from the drinking-water supply system.

The air bleed valve is connected on the intake side to a drinking-water supply line. On the outlet side, the at least one air bleed valve is connected to a vent line. If several air bleed valves are provided in the drinking-water supply system, they can all be connected on the outlet side to a common vent line. The outlet end of such a vent line or main vent line is a vent outlet with a vent port for outputting the air to be discharged from the drinking-water supply system to the external surroundings of the drinking-water supply system, that is, to the interior of the aircraft. Today, this vent outlet is often embodied as an open hose end that is provided in a concealed manner in a cabinet or compartment designed to receive trolleys, often in a bottom pan of a trolley.

Normally, only excess air is discharged from the drinking-water supply system as vent fluid via the vent line or main vent line and out of the vent outlet. In the event of a defective vent valve, however, water can also emerge from the vent outlet together with air as vent fluid.

The drinking-water supply system must be cleaned and disinfected regularly. For this purpose, the entire drinking-water supply system, including the points of use, is flooded with a cleaning and disinfectant fluid. Before the subsequent resumption of the normal use of the drinking-water supply system, the entire drinking-water supply system must first be flushed several times with drinking water in order to ensure that no cleaning and disinfectant fluid remains in the drinking-water supply system.

The thorough flushing of the vent valves has proven to be especially laborious. Today, in order to perform the flushing, the vent valves are fed drinking water via the drinking-water supply lines of the drinking-water supply system.

The above-described systems used today in aircraft for the drinking-water supply require a great amount of cleaning and flushing effort and can impair the operational safety of the aircraft in the event of a defective vent valve.

OBJECT OF THE INVENTION

It is therefore the object of the present invention to provide a technical solution for a drinking-water supply system of an aircraft that reduces the effort required to flush the drinking-water supply system including the vent valve thereof while preferably increasing the operational safety of the drinking-water supply system in the event of a defect in a vent valve.

SUMMARY OF THE INVENTION

The object of the present invention is attained by the vent-outlet fitting described below for a drinking-water supply system of an aircraft. An intake port for receiving a vent fluid from the drinking-water supply system is provided on the rear end of the vent-outlet fitting. The intake port forms the inlet-side closure of an intake pipe that is designed to couple the vent-outlet fitting with a vent line or main vent line of the drinking-water supply system. A vent port for discharging at least a portion of the received vent fluid to external surroundings of the vent-outlet fitting is on an outer end of the vent-outlet fitting turned away from the rear end.

The invention is based on the discovery that the flushing process can be accelerated substantially if, in drinking-water supply systems used today in aircraft that are provided with at least one vent valve, the at least one vent valve is supplied in a cleaning and flushing mode of the drinking-water supply system with a flushing fluid, particularly drinking water, from the vent port, that is, counter to the direction of the vent flow when discharging the vent fluid (during normal operation of the drinking-water supply system).

In order to introduce the flushing fluid, the proposed vent-outlet fitting further has a flushing connection. The flushing connection is coupled with the intake port by a flow passage such that a flushing fluid that is fed in at the flushing connection can be conveyed to the intake port and emerges therefrom. For example, the intake port can be provided at an inlet pipe portion of the flushing connection, in which case the inlet pipe portion transitions into a flushing pipe portion that forms the flushing connection. This transition can be configured in the direction from the flushing pipe portion to the inlet pipe portion with or without a taper or widening.

In addition, the proposed vent-outlet fitting has a cover that can be placed onto and removed from the flushing connection. The cover is provided with at least one through hole. The at least one through hole only forms the vent port of the vent-outlet fitting if the cover is mounted on the flushing connection. Preferably, the cover is not provided with only one through hole, but with a plurality of through holes that form the vent port. The through hole or through holes are designed to allow the vent fluid to pass through the cover and enable the vent fluid to pass through the vent port at the outer end of the vent-outlet fitting.

The flushing connection is designed for connection to a flushing-fluid line on the outer end of the vent-outlet fitting and to introduce the flushing fluid through the flushing connection to the intake port of the vent-outlet fitting only when the cover is removed from the flushing connection. When the cover is mounted on the flushing device, the flushing connection cannot be coupled with a flushing-fluid line in order to introduce the flushing fluid into the flushing connection. Therefore, the concept of the cover mounted on the flushing connection is understood such that the cover is in a mounted state in which the use of the flushing connection by connecting a flushing-fluid line therewith is not possible. The placement of the cover on the flushing connection can be achieved by positioning the cover on an outer end of the flushing connection, for example by pushing it on or twisting the cover onto the flushing connection. Optionally or alternatively, the placement of the cover on the flushing connection can include positioning the cover on an inner portion of the flushing connection, such as by introduction, pushing-in, plugging-in, or insertion of the cover into the flushing connection. The cover and the flushing connection of the proposed vent-outlet fitting are appropriately embodied so as to achieve the above-described mutual mechanical contact with one another.

In order to enable the vent fluid to flow from the intake port along the vent flow direction to the vent port, a vent flow passage is formed in the proposed vent-outlet fitting. In order to enable the vent fluid to flow to the vent port along a flush flow direction that runs counter to the vent flow direction, a flush flow passage is formed in the proposed vent-outlet fitting. Apart from the vent port provided only for the flush flow passage, the vent flow passage and the flush flow passage are preferably formed by a common, preferably identical, flow passage.

When the cover has been removed from the flushing connection, the proposed vent-outlet fitting enables easy connection of a flushing-fluid line to a drinking-water supply system of an aircraft to be flushed. Flushing fluid can be conveyed from the flushing-fluid line that is coupled with and/or connected to the flushing connection of the vent-outlet fitting through the flushing connection to the intake port in order to be conveyed further counter to the vent flow direction provided for the discharging of a vent fluid to at least one vent valve of the drinking-water supply system. The proposed vent-outlet fitting thus enables quick and easy flushing of the drinking-water supply system.

If the proposed vent-outlet fitting is not configured for flushing but for regular venting, namely through the cover that is mounted on the flushing connection, then if a defect occurs in a vent valve that is coupled with the vent-outlet fitting via a vent line or main vent line, a fluid contained in the vent fluid, particularly (former) drinking water, can emerge from the outer end of the vent-outlet fitting, specifically through the at least one through hole of the cover that is mounted in a dedicated position. This enables easy detection of a defect, at least of a vent valve of the drinking-water supply system, thereby increasing the operational safety of the drinking-water supply system.

In a development of the proposed vent-outlet fitting, the cover mounted on the flushing connection covers a portion of the flushing connection that is provided for connection to the flushing-fluid line at least partially. This effectively prevents a flushing-fluid line from being connected to the flushing connection during normal operation of the drinking-water supply system, that is, outside of the cleaning and flushing mode. This increases the operational safety of the drinking-water supply system.

In a development of the proposed vent-outlet fitting, the cover is formed as a perforated cap. The cap is perforated with at least one through hole, preferably a plurality of through holes. Preferably, each through hole has a maximum, preferably uniform, passage width or maximum diameter of 0.8 mm. The cap is preferably designed to be mounted on an outer portion of the flushing connection, for example for pushing-on, twisting, and/or plugging of the cap onto the flushing connection, so that a mechanical contact is brought about between the inner surface of the cap formed as an internal thread or a seal ring that is received in the cap, for example, and the outer surface of the flushing connection formed as a raised area or cross-sectional diameter increase, for example. By virtue of the good accessibility of this cover, the manual placement and removal of the seal from the flushing connection is made possible, so that the drinking-water supply system can be quickly flushed. The cover can preferably only be removed from the flushing connection by loosening or releasing a detent provided on the cover and/or the flushing connection. The detent can preferably only be loosened or released by use of a specific tool. This ensures that only maintenance staff can put the vent-outlet fitting into the configuration for cleaning and flushing mode. A glance at the cover formed as a cap tells maintenance staff of the drinking-water supply system quickly and unambiguously how the flushing connection can be rendered usable for connection to a flushing-fluid line.

Furthermore, in a development of the proposed vent-outlet fitting the at least one through hole of the cover has a maximum passage width or maximum diameter of 0.8 mm. In one embodiment of the cover with a plurality of through holes that form the vent port, all of these through holes preferably have no more than the above-described maximum passage widths or diameters. Preferably, all the through holes are identical. The limitation of the maximum passage width or diameter ensures that the vent port has such a hygienic and contaminant-free design and no dirt, insects, or pathogens are able to penetrate through the proposed vent-outlet fitting into the drinking-water supply system. Hygienic specifications such as those of the FDA (Food and Drug Administration) can thus be satisfied.

In a development of the proposed vent-outlet fitting, the cover and/or the flushing connection has a removal-inhibiting means for preventing unintended removal of the cover mounted on the flushing connection from the flushing connection. The concept of unintended removal includes the accidental removal of the cover by staff, for example by simple contact with the cover, and the loosening of the cover from the flushing connection without the direct action of a person, for example as a result of the vent fluid flowing through the cover or due to vibration during flight.

In a development of the proposed vent-outlet fitting, the flushing connection has a fastening formation for connecting the flushing-fluid line by a quick-action fastener and/or a screw closure. Without restriction thereto, the fastening formation and/or the flushing connection can be designed according to standard ABS1169 of the aircraft manufacturer Airbus. The fastening formation is designed for a tight fit when used in conjunction with a flushing-fluid line that is coupled with the flushing connection between the flushing connection and the flushing-fluid line in order to prevent unintended detachment of the flushing-fluid line from the flushing connection. Preferably, the fastening formation is formed as a portion of the flushing connection with a local cross-sectional thickening or a recessed groove. The flushing-fluid line formed with such a flushing connection then has, at the end thereof that is provided for connecting with the flushing connection, a detent deflected by a spring force that can be temporarily released in order to detach the flushing-fluid line from the flushing connection by application of an opposite force to the detent by displacement of a ring, lever, or pawl, for example.

In a further development of the proposed vent-outlet fitting, the fastening formation is also formed as the above-described removal-inhibiting means for preventing unintended removal of the cover mounted on the flushing connection from same. This makes a compact and economical design of the flushing connection possible, because the fastening formation of the flushing connection is designed both for positioning and holding the cover and for connecting a flushing-fluid line.

Furthermore, in a development of the proposed vent-outlet fitting, the vent-outlet fitting further comprises on its outer end a removable front panel that, when in the installed state, secures the cover mounted on the flushing connection against unintended removal in the sense defined above, that is, against unintended manual removal or loosening without external influences from the flushing connection. The term "removed front panel" is understood to mean that the front panel is not currently capable of blocking the removal of the cover from the flushing connection due to a change in position caused by a user.

According to this development, the proposed vent-outlet fitting is then formed such that, when the front panel is removed, the cover mounted on the flushing connection can be removed from the flushing connection in order to then connect a flushing-fluid line to the flushing connection. The front panel can be installed with or without specific tools on the outer end of the vent-outlet fitting. The term "removal" is understood to mean the taking-off of the front panel from the vent-outlet fitting, a twisting of the front panel, and/or a folding-over of the front panel. The front panel and the cover can be formed such that a tapered portion of the cover mounted on the flushing connection is inserted into an opening of the installed front panel and fixed and/or secured to the edge of the opening by mechanical contact. Preferably, the cover and the front panel are designed so as to be fixable to one another by respective portions of the cover and front panel with different opening widths and/or diameters in relation to one another that are provided for the mutual mechanical contact.

In a further development of the proposed vent-outlet fitting, the cover is and/or can be integrated at least partially into the front panel. The vent-outlet fitting is then formed such that the removal of the front panel also results in removal of the cover from the flushing connection. This enables quick and easy access to the flushing connection. At the same time, the cover integrated into the front panel can thus be better safeguarded from loss after removal from the flushing connection.

In yet a further development of the last-mentioned development of the proposed vent-outlet fitting, the front panel is designed to be held by the cover and/or the flushing connection. The front panel has a through hole or recess for this purpose, for example, that can be plugged onto the cover that is mounted on the flushing connection. For example, when in the installed state, the front panel is fixed in place by at least one removable mounting screw or other fastener.

According to this development, after loosening and removal of the mounting screw(s), the front panel then continues to be held, particularly directly by the cover mounted on the flushing connection and indirectly by the flushing connection. According to this development, when the front panel is installed again, it can be held initially only by the cover mounted on the flushing connection, so that the mounting screw(s) can be easily inserted and tightened.

Furthermore, in a development of the proposed vent-outlet fitting a leak indicator is provided on the outer end of the vent-outlet fitting, particularly in the front panel. The leak indicator is designed to indicate that drinking water has leaked into the vent system, for example as a result of a defective vent valve being coupled with the proposed vent-outlet fitting. In the event of such a leak, the vent fluid fed to the vent-outlet fitting contains not only air but also water. The leak indicator can be formed as an alarm unit for signaling a leak, such as a blinking lamp, for example, that is coupled with a sensor for detecting water in the vent fluid. In one especially simple embodiment, the leak indicator can be formed by the vent port in conjunction with lettering provided on the outer end of the vent-outlet fitting. In the event of a leak, water emerges from the outer end of the vent-outlet fitting. The lettering is such that the air crew and/or maintenance staff gains information about the presence of a leak from water that has emerged or is emerging on the outer end of the vent-outlet fitting and any residues from emerging water that may be present on the outer end of the vent-outlet fitting.

The object of the present invention is also achieved by a wall element for a galley, particularly of an aircraft, as well as by a galley with such a wall element. The wall element comprises a vent-outlet fitting according to one of the above-described embodiments, developments, further developments, and any combination of features of a vent-outlet fitting according to the invention. The wall element is designed to be installed in this way in the galley, and the outer end of the vent-outlet fitting is positioned so as to be directly reachable by and preferably visible to a user of the galley, particularly air crew. In the installed state, that is, when being used in a galley, the wall element preferably forms a wall surface of the galley. The wall element is preferably designed to be installed in a galley adjacent a point of use of the drinking-water supply system, such as a steam oven or a beverage preparation apparatus, or forms a part of a point of use in the installed state.

Since the vent-outlet fitting that can be used to flush the drinking-water supply system is provided in the galley so as to be directly reachable, accessible, and visible, maintenance staff can quickly and easily flush the drinking-water supply system, particularly the vent valves thereof that are coupled with the vent-outlet fitting. Tedious access to maintenance devices of the drinking-water supply system that are concealed during normal operation of the galley is eliminated. What is more, by virtue of the good visibility of the vent port of the vent-outlet fitting, the aircrew can quickly identify a leak at a vent valve of the drinking-water supply system, and operational safety is increased.

Furthermore, in a development of the wall element and/or of the galley, the wall element is designed to be installed in this way in the galley, and it is provided adjacent a sink of the galley and/or forms the sink at least in part, and the vent-outlet fitting is provided above, at, and/or in the sink of the galley in order to catch liquid emerging at the outer end of the vent-outlet fitting in the sink. Since water that emerges from the vent-outlet fitting in the event of the leaking of a vent valve of the drinking-water supply system is discharged automatically via the sink, operational safety is increased.

The object of the invention is also achieved by a proposed method of flushing a drinking-water supply system of an aircraft that is provided with at least one vent valve. The method is aimed at a drinking-water supply system that comprises a vent-outlet fitting according to any one of the above-described embodiments, developments, further developments, and any combination of features, with the intake port of the vent-outlet fitting being coupled with at least one vent valve of the drinking-water supply system in order to receive the vent fluid. The vent-outlet fitting is preferably provided in a galley of the aircraft.

In the proposed flushing method, the cover of the vent-outlet fitting is first removed from the flushing connection of the vent-outlet fitting. If the vent-outlet fitting has a front panel according to one of the developments proposed above, then the front panel can first be removed before the last-mentioned step such that the cover can be removed from the flushing connection. A flushing-fluid line is then coupled with the flushing connection on an outer end of the vent-outlet fitting. A flushing fluid, particularly drinking water, is then introduced from the coupled flushing-fluid line into the flushing connection and conveyed via the intake port of the vent-outlet fitting to the at least one vent valve. The proposed method enables quick and easy flushing of a drinking-water supply system, particularly the vent valve thereof, of an aircraft.

After flushing with the flushing fluid, the proposed method can comprise the step, in order to dry and/or preserve the cleaned and flushed drinking-water supply system, of introducing a drying fluid, particularly air or another gas, into the drinking-water supply system, particularly into the drinking-water supply lines and venting valve (s) thereof. This introduction is preferably performed in whole or in part via the flushing connection of the proposed vent-outlet fitting. The introduction of the drying fluid can be done by for example blowing air into the flushing connection.

In another development of the proposed method, in order to carry out the method steps, maintenance staff merely accesses the cover and the flushing connection from the outer end of the vent-outlet fitting.

Furthermore, in a development of the proposed method the steps of the method are carried out in an area of the galley that is directly accessible to a user of the galley. A directly accessible area of the galley is understood to be an area that can be accessed or reached for the purpose of carrying out the method steps without conversions and/or the opening of doors, apart from the removal of a front panel of the vent-outlet fitting that may be present.

The invention includes any combination of the developments described above.

BRIEF DESCRIPTION OF THE DRAWINGS

To elucidate the proposed vent-outlet fitting, wall element, and flushing method, embodiments will now be described with reference to the figures that follow.

FIG. 3 is a front view of an embodiment of a proposed wall element with an embodiment of the proposed vent-outlet fitting included therein;

FIG. 4 is a large-scale view of a section along line A-A of the wall element shown in FIG. 3 with the vent-outlet fitting included therein;

FIG. 5 is a detail view of the front view of the wall element illustrated in FIGS. 3 and 4 and of the vent-outlet fitting configured for normal venting mode;

FIG. 6 is a detail view of a front view of the wall element shown in FIGS. 3 and 4 and of the vent-outlet fitting configured for flushing mode with flushing-fluid line coupled therewith;

In the figures, identical or similar components are designated with the same reference symbols throughout.

EMBODIMENTS OF THE INVENTION

Figure 1:
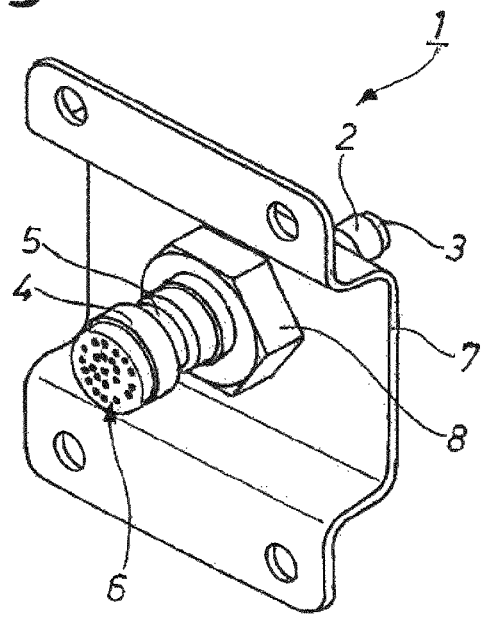
FIG. 1 is a perspective view of an embodiment of the proposed vent-outlet fitting.

FIG. 1 is a perspective view of an embodiment of the proposed vent-outlet fitting. The vent-outlet fitting 1 has on its rear end an intake pipe 2 with an intake port 3. The intake pipe 2 is designed to be coupled with an unillustrated vent line and to take in a vent fluid from the vent line. A flushing connection 5 is provided on the outer end of the vent-outlet fitting 1. A cover 4 is mounted or positioned on the front end of the flushing connection 5 such that at least part of the portion of the flushing connection 5 provided for connection to a flushing-fluid line is covered and/or blocked by the cover 4. The cover 4 has a vent port 6 that is formed by a plurality of through holes with diameters of 0.8 mm. The vent-outlet fitting 1 also has a U-shaped bent holding plate 7 with angled end legs into which a base body 10 (see FIG. 7) of the vent-outlet fitting has been inserted on the rear end in order to mount the vent-outlet fitting 1. The base body 10 is fixed to the holding plate 7 by a nut 8 that is mounted from the outer end of the vent-outlet fitting on the base body 10.

Figure 2:
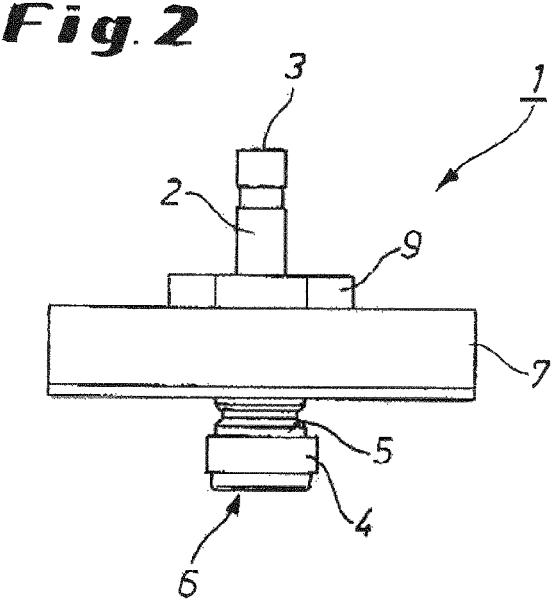
FIG. 2 is a top view of the embodiment of the proposed vent-outlet fitting that is shown in a perspective view in FIG. 1.

FIG. 2 shows a top view of the vent-outlet fitting 1 that is shown in a perspective view in FIG. 1. As can be seen from FIG. 2, a nut-like hexagonal collar 9 of the base body 10 forms a counter-bearing for fixing the holding plate 7 on the side turned away from the nut 8.

The vent-outlet fitting 1 shown in FIGS. 1 and 2 is designed to convey a vent fluid from the intake port 3 through a flow passage provided in the base body 10 and formed as a through hole with a different inside diameter to the vent port 6. When the cover 4 is removed from the flushing connection 5, a flushing-fluid line can be coupled with the flushing connection 5, and a flushing fluid can be conveyed through the flow passage in the base body 10 from the flushing connection 5 to the intake port 3.

FIG. 3 shows a view from outside of an embodiment of a proposed wall element with an embodiment of the proposed vent-outlet fitting included therein. The wall element 12 shown in FIG. 3 is provided for example in order to be mounted above a sink in a galley of an aircraft. A drinking water shut-off switch 13 and an embodiment of the proposed vent-outlet fitting are integrated into a panel 22 of the wall element 12. The vent-outlet fitting is basically identical to the vent-outlet fitting shown in FIGS. 1 and 2, but it also has a front panel 14 on its outer end that is fixed to the wall panel 22 by mounting screws 15.

FIG. 4 is an enlarged sectional view along line A-A of the wall element shown in FIG. 3 with the vent-outlet fitting included therein. The vent-outlet fitting 1 shown in FIG. 4 comprises a preferably integral base body 10 in which a flow passage 20 extends from the intake port 3 to a feed opening 19 of the flushing connection 5.

FIG. 4 shows the vent-outlet fitting 1 in the configuration for normal venting mode, not for flushing mode. The cover 4 formed as a perforated cap is mounted on the outer periphery of the flushing connection 5. An elastic ring 17 is recessed in the inner periphery of the cover 4 constitutes removal-inhibiting means as proposed above for preventing unintended removal of the cover 4 mounted on the flushing connection 5. The cover 4 is provided with a plurality of through holes 16 with diameters of 0.8 mm that form the vent port 6 on the outer end of the vent-outlet fitting 1. A vent fluid made from the intake port 3 can emerge through the flow passage 20 and through the through holes 16 of the cover 4 at the vent port 6 on the outer end of the vent-outlet fitting 1.

The front panel or cover 14 is mounted on the outer end of the vent-outlet fitting 1 that is fixed in place by the two mounting screws 15 that are screwed into a section 30 of the wall element 12. The front panel 14 has an opening 24 through which the cover 4 passes with its front portion at the outer end of the vent-outlet fitting 1. Since the cover 4 has a tapered portion at its front end and/or an outwardly projecting rim at the rear end turned toward the vent-outlet fitting, the fixed front panel 14 secures the cover 4 against unintended removal from the flushing connection 5. Either an air gap to the outer periphery of the cover 4 can be provided between the edge of the opening 24 of the front panel 14, or the cover 4 is fitted into the opening of the front panel 14 and/or received in the opening. The embodiment of the proposed vent-outlet fitting shown in FIG. 4 is constructed such that the front panel 14 can be attached to the cover 4 that is mounted on the flushing connection 5 and held temporarily by the cover 4 until it is fixed in place by screwing in the mounting screws in.

FIG. 5 shows a detail of a front view of the wall element shown in FIGS. 3 and 4 and of the vent-outlet fitting configured for normal venting mode. The front panel 14 is fixed to the wall panel 22 by the two mounting screws 15. A front portion of the cover 4 formed as a perforated cap includes the vent port 6, and the cover 4 mounted on the outer periphery of the flushing connection 5 (not visible in FIG. 5), extends through the opening 24 of the front panel 14 at the outer end of the vent-outlet fitting 1.

Moreover, the embodiment of the proposed vent-outlet fitting 1 shown in FIG. 5 has a leak indicator for normal venting mode formed as lettering 25 beneath the vent port 6 that indicates a leak.

In order for the vent-outlet fitting 1 shown for the sake of example in FIG. 4 to be in the configuration for flushing mode, that is, not for normal venting mode, the front panel 14 must be removed from the wall panel 22 as shown in FIG. 6 and the cover 4 removed from the flushing connection 5. In order to execute flushing mode, a flushing-fluid line 55 can then be coupled with the flushing connection 5 that can be accessed on the outer end of the vent-outlet fitting 1. For connecting the flushing-fluid line 55 with the flushing-fluid line 5, according for example to standard ABS1169 of the aircraft manufacturer Airbus, the flushing connection 5 has on its outer periphery a fastening formation 18 formed by a radially projecting ridge of the flushing connection.

Figure 7:
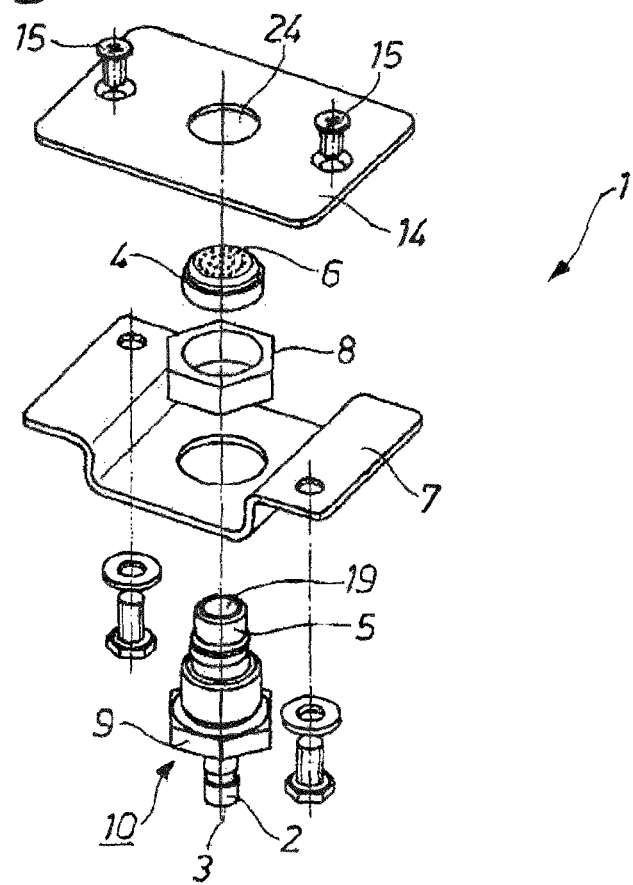
FIG. 7 in a perspective exploded view of an embodiment of the proposed vent-outlet fitting.
Figure 8:
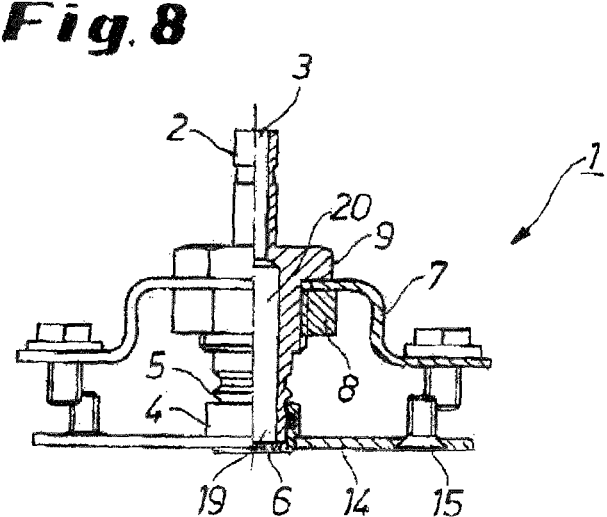
FIG. 8 shows the vent-outlet fitting from FIG. 7 in a top view (left half) and in section (right half)

FIGS. 7 and 8 show another embodiment of the proposed vent-outlet fitting in a perspective exploded view as well as in a top view (left half of FIG. 8) and in cross section (right half of FIG. 8). In comparison to the embodiment shown in FIGS. 3 and 4, in the embodiment of FIGS. 7 and 8 only the arrangement of the mounting screws 15 and the shape of the front panel 14 have changed.

Figure 9:
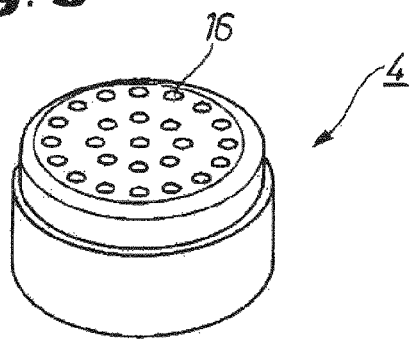
FIG. 9 is a perspective view of a cover of an embodiment of the proposed vent-outlet fitting formed as a cap.
Figure 10:
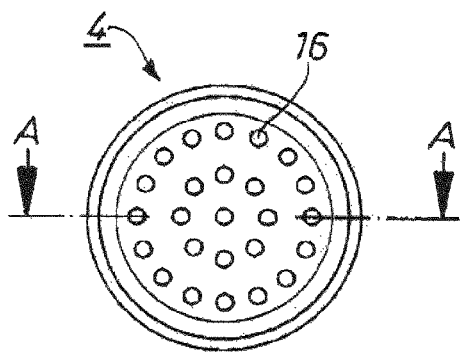
FIG. 10 is a front view of the cover shown in FIG. 9.
Figure 11:
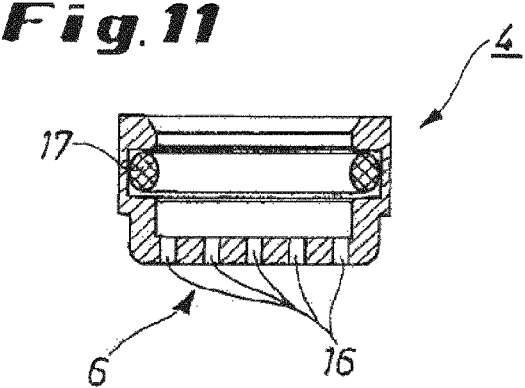
FIG. 11 is a section taken line A-A of the cover shown in FIGS. 9 and 10.

FIGS. 9 to 11 are detailed views of the cover 4 that is perforated with through holes 16 and provided on its inner periphery with the removal-inhibiting means 17 formed by an elastic ring partly recessed in its inner surface.

Figure 12:
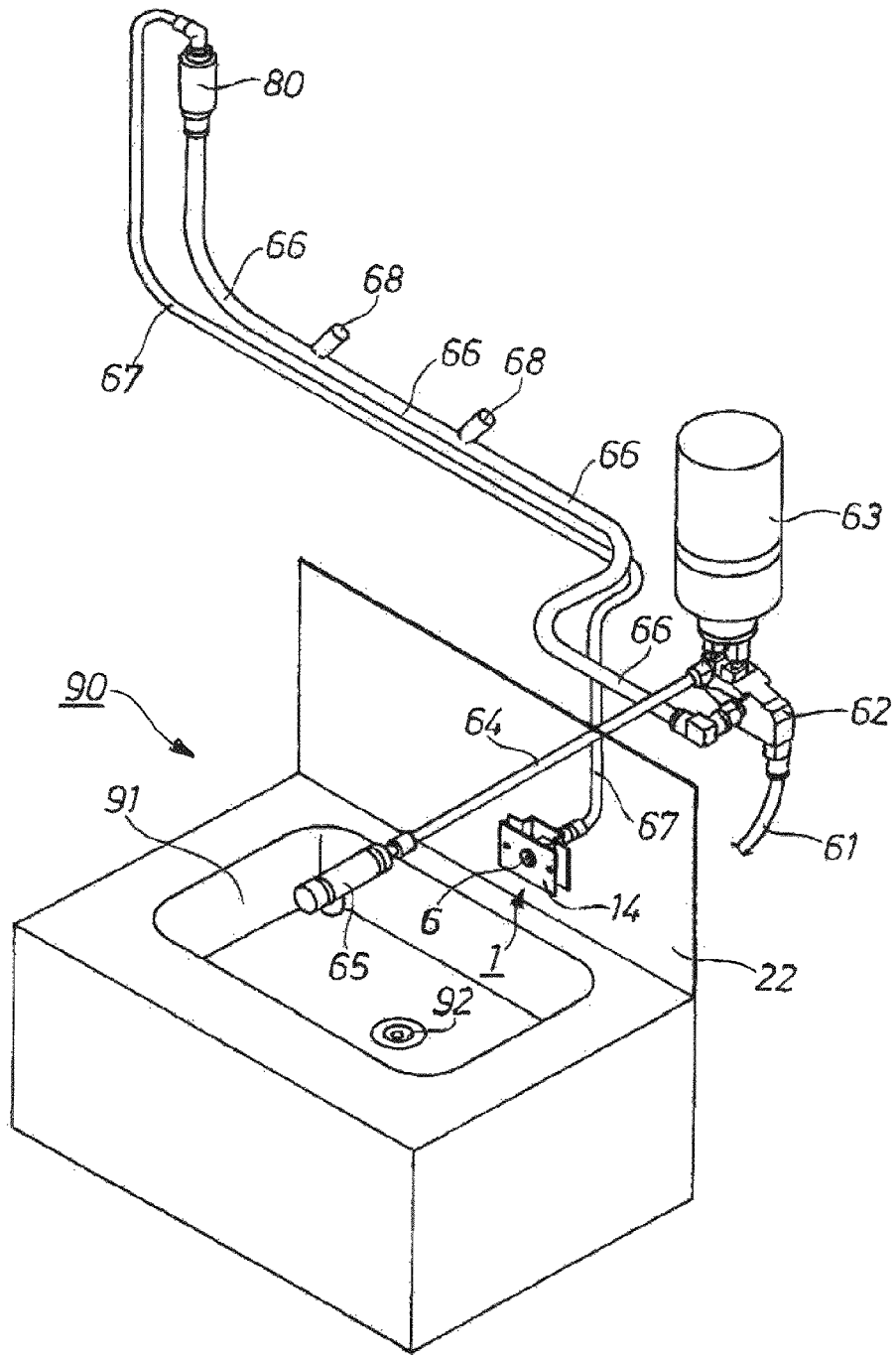
FIG. 12 is a view of a drinking-water supply system of an aircraft that has been shown in a technically simplified manner with an embodiment of the proposed vent-outlet fitting in a galley with a sink.

FIG. 12 is a view of an aircraft drinking-water supply system shown in a technically simplified manner with an embodiment of the proposed vent-outlet fitting in a galley. A galley 90 is shown in FIG. 12 by way of example in part by a galley component comprised of a sink 91 and the rear wall 22. An embodiment of the proposed vent-outlet fitting 1 is mounted on the wall 22 such that the outer end of the vent-outlet fitting 1 is directly visible to and accessible by a user of the galley.

In the drinking-water supply system shown in FIG. 12, a drinking water line 61 connected to a drinking water tank (not shown) is connected to a manifold 62. A water filter [63] is connected to the manifold 62 for feeding drinking water through a drinking-water supply line 64 to a self-venting tap 65 for dispensing drinking water.

Moreover, an additional drinking-water supply line 66 of the drinking-water supply system is connected to the manifold 62 that is coupled with a vent valve 80 of the drinking-water supply system. Additional points of use of the drinking-water supply system are connected to the drinking-water supply line 66 via connectors and/or fittings. These points of use can be steam ovens or beverage-preparation devices, for example, that use drinking water supplied via the drinking-water supply line 66 in order to produce steam and/or beverages. In FIG. 12, only connections 68 for connecting the named point-of-use devices to the drinking-water supply line 66 are shown.

The drinking-water supply line 66 is connected to the intake side of the vent valve 80. A vent line 67 is connected to the outlet side of the vent valve 80. A vent fluid, particularly air, can flow via the vent line 67 along in the drinking-water supply line 66 from the vent valve 80 to the vent-outlet fitting 1. The vent line 67 can be coupled with the intake pipe 2 of the vent-outlet fitting 1 by an AVS-Römer ELSA plug connection, for example.

The outer end of the vent-outlet fitting 1 is directly visible and reachable and positioned so as to be visible on the rear wall 22 of the galley 90, parts of which are shown. The galley 90 is equipped with the sink 91 that is beneath the proposed vent-outlet fitting 1. In the event of a leak through the vent valve 80, that is, when the vent fluid contains not only air but also water, the water being fed via the vent line 67 emerges through the vent port 6 and is caught in the sink 91 of the galley 90 and discharged through a drain 92 provided in the sink.

In the case of a galley without a sink, that is, if the galley is only equipped with steam ovens or beverage preparation apparatuses, the vent-outlet fitting 1 is provided in a directly visible and accessible area of the galley, preferably adjacent a steam oven or a beverage preparation apparatus.

The invention claimed is:

1. In combination with of an aircraft drinking-water supply system having a vent valve, a vent-outlet fitting comprising:

an intake port provided on a rear end of the vent-outlet fitting for receiving a vent fluid from the vent valve;

a vent port on an outer end of the vent-outlet fitting for feeding at least a portion of the vent fluid received to surroundings of the vent-outlet fitting;

a flushing connection; and a cover releasably mounted on the flushing connection and having at least one through hole, forming the vent port when mounted on the flushing connection, the flushing connection being configured for connection to a flushing-fluid line at the outer end of the vent-outlet fitting and for introducing a flushing fluid through the flushing connection to the intake port of the vent-outlet fitting only when the cover is removed from the flushing connection.

2. The vent-outlet fitting defined in claim 1, wherein the cover, when mounted on the flushing connection, at least partially covers a connecting portion of the flushing connection that is provided for connection to the flushing-fluid line.

3. The vent-outlet fitting defined in claim 1, wherein the cover is a perforated cap.

4. The vent-outlet fitting defined in claim 1, wherein the at least one through hole of the cover has a maximum passage width or a maximum diameter of 0.8 mm.

5. The vent-outlet fitting defined in claim 1, wherein the cover or the flushing connection has removal-inhibiting means for preventing unintended removal of the cover mounted on the flushing connection from same.

6. The vent-outlet fitting defined in claim 5, wherein the flushing connection has a fastening formation for connecting the flushing-fluid line by a quick-action fastener or a screw closure.

7. The vent-outlet fitting defined in claim 6, wherein both the fastening formation and the removal-inhibiting means both serve for prevention of unintended removal of the cover that is mounted on the flushing connection from same.

8. The vent-outlet fitting defined in claim 1, further comprising:

a removable front panel on an outer end of the fitting and that, when in the mounted state, protects the cover mounted on the flushing connection against removal from same.

9. The vent-outlet fitting defined in claim 8, wherein the cover is or can be integrated at least partially into the front panel.

10. The vent-outlet fitting defined in claim 8, wherein the front panel is configured to be held by the cover or the flushing connection on the outer end of the fitting.

11. The vent-outlet fitting defined in claim 1, further comprising:

a leak indicator at or adjacent the outer end of the vent-outlet fitting.

12. A wall element for a galley of an aircraft, the wall element having the vent-outlet fitting defined in claim 1, the wall element being installable in the galley with the outer end of the vent-outlet fitting directly reachable by and visible to a user of the galley.

13. The wall element defined in claim 12, wherein the wall element is provided adjacent a sink of the galley or forms the sink at least in part, and the vent-outlet fitting is provided above, at, or in the sink of the galley in order to catch liquid emerging at the outer end of the vent-outlet fitting in the sink.

14. A method of flushing an aircraft drinking-water supply system having a vent valve and, connected to the intake port of the vent-outlet fitting defined in claim 1 that is provided particularly in a galley of the aircraft for the purpose of receiving and venting a vent fluid, the method comprising the following steps:

removing the cover of the vent-outlet fitting from the flushing connection of the vent-outlet fitting;

connecting a flushing-fluid line to the flushing connection on the outer end of the vent-outlet fitting; and introducing a flushing fluid from the connected flushing-fluid line into the flushing connection via the intake port of the vent-outlet fitting to the vent valve.

15. The method defined in claim 14, wherein, in order to carry out the steps of the method, maintenance staff access the cover and the flushing connection only from the outer end of the vent-outlet fitting.

16. The method defined in claim 14, wherein the steps of the method are carried out in an area of the galley that is directly accessible to a user of the galley.

* * * * *